US012754579B2

(12) United States Patent
Xie et al.

(10) Patent No.: US 12,754,579 B2
(45) Date of Patent: Oct. 6, 2026

(54) LOW DROPOUT REGULATOR

(71) Applicant: GIGADEVICE SEMICONDUCTOR INC., Beijing (CN)

(72) Inventors: Can Xie, Beijing (CN); Zhi Liu, Beijing (CN)

(73) Assignee: GIGADEVICE SEMICONDUCTOR INC., Beijing (CN)

( * ) Notice: Subject to any disclaimer, the term of this patent is extended or adjusted under 35 U.S.C. 154(b) by 154 days.

(21) Appl. No.: 18/540,648

(22) Filed: Dec. 14, 2023

(65) Prior Publication Data

US 2024/0319756 A1 Sep. 26, 2024

(30) Foreign Application Priority Data

Mar. 21, 2023 (CN) ......................... 202310280313.6

(51) Int. Cl.
*G05F 1/575* (2006.01)

(52) U.S. Cl.
CPC .................................... *G05F 1/575* (2013.01)

(58) Field of Classification Search
CPC .......... G05F 1/575; G05F 1/565; G05F 1/569; G05F 1/571; G05F 1/573; G05F 1/5735; G05F 1/59; G05F 1/595
See application file for complete search history.

(56) References Cited

U.S. PATENT DOCUMENTS 5,563,501 A 10/1996 Chan
10,768,650 B1 * 9/2020 Huang .................... G05F 1/575
11,630,472 B2 * 4/2023 Ankamreddi ........... G05F 1/575 323/273
2003/0102851 A1 * 6/2003 Stanescu ................. G05F 1/575 323/280
2012/0280667 A1 11/2012 Drebinger et al.
2014/0266106 A1 * 9/2014 El-Nozahi ............... G05F 1/573 323/280
2019/0146531 A1 * 5/2019 Yung ........................ G05F 1/563 363/21.01
2021/0303014 A1 9/2021 Migliavacca
2021/0397207 A1 * 12/2021 Joo ......................... H02M 1/08
2022/0206521 A1 6/2022 Choi et al.

FOREIGN PATENT DOCUMENTS

CN 101281410 A 10/2008
CN 102200791 A 9/2011
WO 2019157991 A1 8/2019

* cited by examiner

*Primary Examiner* — Nguyen Tran
(74) *Attorney, Agent, or Firm* — IPro, PLLC

(57) ABSTRACT

Disclosed is a low dropout regulator (LDO) comprising: an error amplifier (EA), whose input terminals receive a reference voltage and an LDO output voltage or its sampled voltage; a power transistor, whose gate is coupled to an output terminal of EA and whose drain is an output node for the output voltage; a first frequency compensation branch, comprising a first capacitor and a current amplifier (CA) amplifying the current flowing through the first capacitor; and a second capacitor, coupled between a second internal node of EA and the output node, to form a left-half-plane zero of LDO. The first capacitor is coupled between the output node and CA, and CA is coupled to the output terminal or a first internal node of EA to form a first negative feedback loop in LDO. Thus, this disclosure provides a highly stable LDO suitable for low power supply and wide load current range.

20 Claims, 5 Drawing Sheets

LOW DROPOUT REGULATOR

CROSS-REFERENCE TO RELATED APPLICATIONS

This application claims priority to Chinese patent application No. 202310280313.6 filed on Mar. 21, 2023, the disclosure of which is incorporated herein by reference in its entirety and for all purposes.

TECHNICAL FIELD

The disclosure herein relates to the field of analog circuits, and in particular to a low dropout regulator.

BACKGROUND

A low dropout regulator (LDO) is usually used to reduce an external power supply voltage by a certain value and stably output the reduced voltage as a power supply voltage required by some circuits. Usually, LDO is a feedback system, which needs frequency compensation to ensure the stability of the system. However, since the load current of the LDO will vary greatly in practical applications, which will result in the transconductance and output impedance of its output power transistor to vary greatly, a large change in the related poles may be caused, which poses a challenge for the stability of the LDO.

In the existing circuit design of the LDO, a voltage buffer is usually inserted between the output of the error amplifier (EA) and the gate of the power transistor to solve the stability problem. However, the introduction of the voltage buffer will reduce the swing of the gate of the power transistor and increase the requirement on the power supply voltage, so this structure is no longer applicable in the case of low power supply voltage and high load current.

Therefore, there is a need for a highly stable LDO circuit design suitable for low power supply voltage and wide load current range.

SUMMARY

According to an aspect of the present disclosure, a low dropout regulator is provided, which comprises: an error amplifier, two input terminals of which respectively receive a reference voltage and an output voltage of the low dropout regulator or a sampled voltage obtained by sampling the output voltage; a power transistor, the gate of which is coupled to an output terminal of the error amplifier, and the drain of which serves as an output node to output the output voltage; a first frequency compensation branch, comprising a first frequency compensation capacitor and a current amplifier for amplifying the current flowing through the first frequency compensation capacitor, wherein, the first frequency compensation capacitor is coupled between the output node and the current amplifier, and the current amplifier is coupled to the output terminal of the error amplifier or a first internal node of the error amplifier so as to form a first negative feedback loop in the low dropout regulator; and a second frequency compensation capacitor, coupled between a second internal node of the error amplifier and the output node, so as to form a left half-plane zero of the low dropout regulator.

BRIEF DESCRIPTION OF FIGURES

The above and other objects, features and advantages of the present disclosure will become more apparent from the more detailed description of the exemplary embodiments of the present disclosure taken in conjunction with the accompanying drawings, wherein the same reference numerals generally refer to the same parts in exemplary embodiments of the present disclosure.

DETAILED DESCRIPTION

Figure 1:
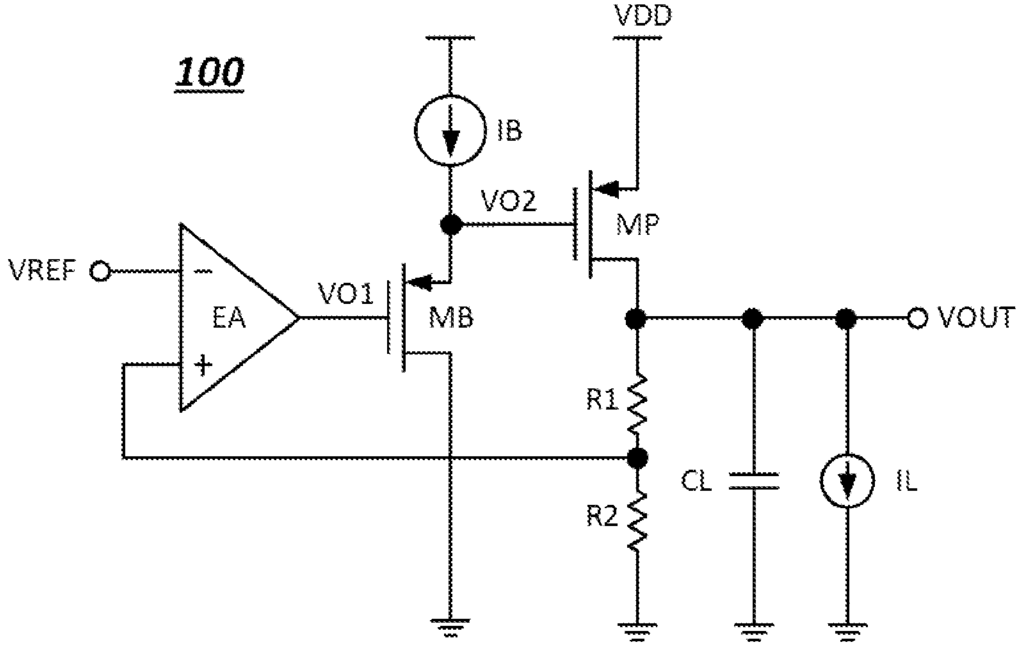
FIG. 1 shows a schematic diagram of the composition of a typical LDO circuit.

Some embodiments of the present disclosure will be described in more detail below with reference to the accompanying drawings. Although the embodiments of the present disclosure are shown in the drawings, it should be understood that the present disclosure may be embodied in various forms and should not be limited to the embodiments set forth herein. Rather, these embodiments are provided so that this disclosure will be thorough and complete, and will fully convey the scope of the disclosure to those skilled in the art.

Generally speaking, in the existing LDO circuit design, a voltage buffer may be inserted between the output of the error amplifier and the gate of the power transistor, to separate the high output impedance of the error amplifier from the large parasitic capacitance contributed by the gate of the power transistor. Therefore, the pole contributed by the gate of the power transistor is pushed to higher frequency, making the whole LDO circuit easy to realize the frequency compensation. However, there is a problem with this circuit structure, that is, since the insertion of a voltage buffer (such as a source follower) will consume a voltage margin of $V_{GS}$, when the output terminal of the LDO has a large load current and thus the $V_{GS}$ of the power transistor is very large, the DC operating point of the LDO operating at a low power supply voltage may be abnormal, as will be described in detail in conjunction with FIG. 1 later.

FIG. 1 shows a schematic diagram of the composition of a typical LDO circuit design with a voltage buffer.

Figure 2A:
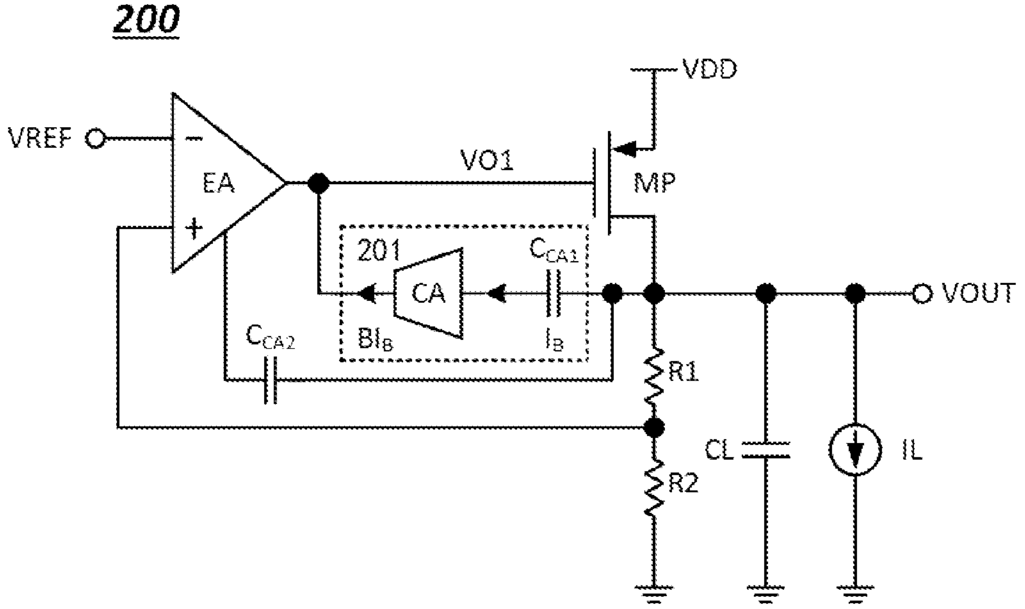
FIG. 2A and FIG. 2B respectively show schematic diagrams of the composition of an LDO circuit according to some embodiments of the present disclosure.
Figure 2B:
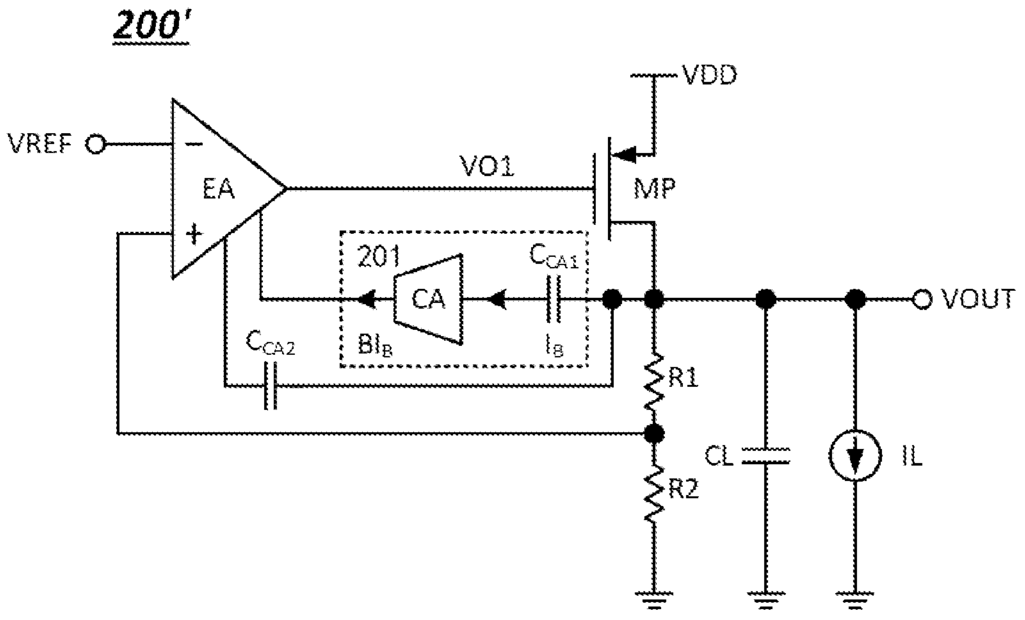

As shown in FIG. 1, the LDO 100 includes an error amplifier EA, a power transistor MP, voltage-dividing and sampling resistors R1 and R2, and a voltage buffer inserted between an output VO1 of the error amplifier EA and a gate VO2 of the power transistor MP. Those skilled in the art should understand that, although FIG. 1 and FIGS. 2A-2B described later also show an off-chip load capacitor $C_L$ and a load current $I_L$, these off-chip load capacitor $C_L$ and load current $I_L$ do not belong to the LDO, but are external loads to be connected to the LDO in actual use. Because these external loads may affect the frequency characteristics of the LDO, they are shown in FIG. 1 and FIGS. 2A-2B described later.

The voltage buffer is composed of a PMOS transistor MB and a current source IB. The output voltage VOUT of the LDO 100 is sampled by the voltage-dividing and sampling resistors R1 and R2, and the obtained sampling voltage is input to the non-inverting input terminal of the error amplifier EA. The difference between the obtained sampling voltage and a reference voltage VREF input to the inverting input terminal of the error amplifier EA passes through a negative feedback loop composed of the error amplifier EA, the voltage buffer and the power transistor MP and then returns to the output node, so as to control the output voltage VOUT at a stable value which ensures the sampling voltage is equal to the reference voltage VREF.

Due to the existence of the voltage buffer, the pole contributed by the node VO2 is located at a high frequency, which is beneficial to the frequency compensation of the LDO circuit. But there is a problem with this circuit structure, that is, since the insertion of a voltage buffer consumes a voltage margin of $V_{GS}$, the minimum operating voltage $V_{DD\_MIN}$ of the LDO circuit in FIG. 1 is:

$$V_{DD\_MIN} = V_{GSP} + V_{GSB} + V_{DS}$$

In the above formula, $V_{GSP}$ is the absolute value of the $V_{GS}$ voltage consumed by the output power transistor MP, $V_{GSB}$ is the absolute value of the $V_{GS}$ voltage consumed by the transistor MB as a source follower, and $V_{DS}$ is a voltage required for the normal operation of the output terminal of the error amplifier EA, which is usually the drain-source voltage of its output transistor. Since the $V_{GSP}$ of the power transistor will be very large due to that the output terminal of the LDO is connected to a large load current $I_L$, in the case of the large load current $I_L$, a low operating voltage VDD may not satisfy the above formula, that is, the LDO circuit cannot work normally. In other words, in the case of low power supply voltage and large load current, this structure type of LDO circuit is no longer applicable.

In view of this, the present disclosure proposes to remove the above-mentioned voltage buffer, and instead use a first frequency compensation branch (including a first frequency compensation capacitor and a current amplifier) to form negative feedback so as to perform frequency compensation on the LDO, wherein a capacitance multiplication effect is achieved by the current amplification. That is to say, compared with the traditional Miller compensation, the magnification of the first frequency compensation capacitor is at least the product of the current magnification of the current amplifier and the DC gain of the output stage of the LDO, so the required compensation capacitance value in the present disclosure is far smaller than that in the traditional method, so that a smaller on-chip capacitor can be used to achieve frequency compensation and reduce the area of the chip. In addition, the inventors of the present application notice that the magnitude of the load current will affect the magnitude of the output transconductance of the power transistor, thereby affecting the effect of frequency compensation, and the effect is poor in the case of a medium load current (about a few mA). Therefore, in order to ensure that the LDO of the present disclosure has good stability in a wide load current range of about 10 μA~500 mA, the present disclosure also proposes to introduce a left-half-plane zero by adding a frequency compensation capacitor coupled to the output voltage at an internal node of the error amplifier used by the LDO, so as to compensate the phase in the case of the medium load current and thus ensure the stability under the condition of the medium load current.

FIG. 2A shows a system block diagram of an LDO circuit according to one embodiment of the present disclosure. This structure can not only work under low supply voltage, but also ensure good stability under wide load current range.

Compared with FIG. 1, the LDO 200 shown in FIG. 2A removes the voltage buffer, and realizes frequency compensation by adding a first frequency compensation branch 201 (including a first frequency compensation capacitor $C_{CA1}$ and a current amplifier CA) and a second frequency compensation capacitor $C_{CA2}$.

As shown in FIG. 2A, the gate of the power transistor MP is coupled to the output terminal of the error amplifier EA. Therefore, it can be concluded that the minimum operating voltage $V_{DD\_MIN}$ of the LDO 200 is:

$$V_{DD\_MIN} = V_{GSP} + V_{DS}$$

As mentioned above, $V_{GSP}$ is the absolute value of the $V_{GS}$ voltage consumed by the output power transistor MP, and $V_{DS}$ is the voltage required by the output terminal of the error amplifier EA to work normally. It can be seen that, the introduction of the frequency compensation structure of the LDO 200 does not consume additional voltage margin, so the LDO 200 is applicable for working scenarios with low operating voltage and large load current.

As shown in FIG. 2A, the output signal VOUT at the output terminal of the LDO is coupled to the input terminal of the current amplifier CA through the first frequency compensation capacitor $C_{CA1}$, and then after being amplified B times by the current amplifier CA, is connected to the output terminal of the error amplifier EA through the output terminal of the current amplifier CA, and then after being invertingly amplified by the output power transistor MP, returns to the output terminal of the LDO, thus forming a negative feedback. It can be said that the first frequency compensation capacitor $C_{CA1}$, the current amplifier CA and the power transistor MP as the output stage constitute a negative feedback loop, that is to say, the negative feedback loop includes at least the first frequency compensation capacitor $C_{CA1}$, the current amplifier CA and power transistor MP. Therefore, the multiplication effect of the compensation capacitor $C_{CA1}$ is not only related to the current amplification factor B of the current amplifier CA, but also related to the DC gain of the output stage of the LDO, which enhances the effect of capacitance multiplication.

As shown in FIG. 2A, the LDO 200 also includes a second frequency compensation capacitor $C_{CA2}$, which couples the output signal VOUT of the LDO to an internal node of the error amplifier EA (hereinafter referred to as a second internal node), so as to form a left-half-plane zero of the LDO 200. As mentioned earlier, this zero is used to compensate the phase in the case of the medium load current (about a few mA) and increase the phase margin in the case of the medium load current, thereby ensuring that the LDO 200 has good stability in a wide range of load current.

Figure 3A:
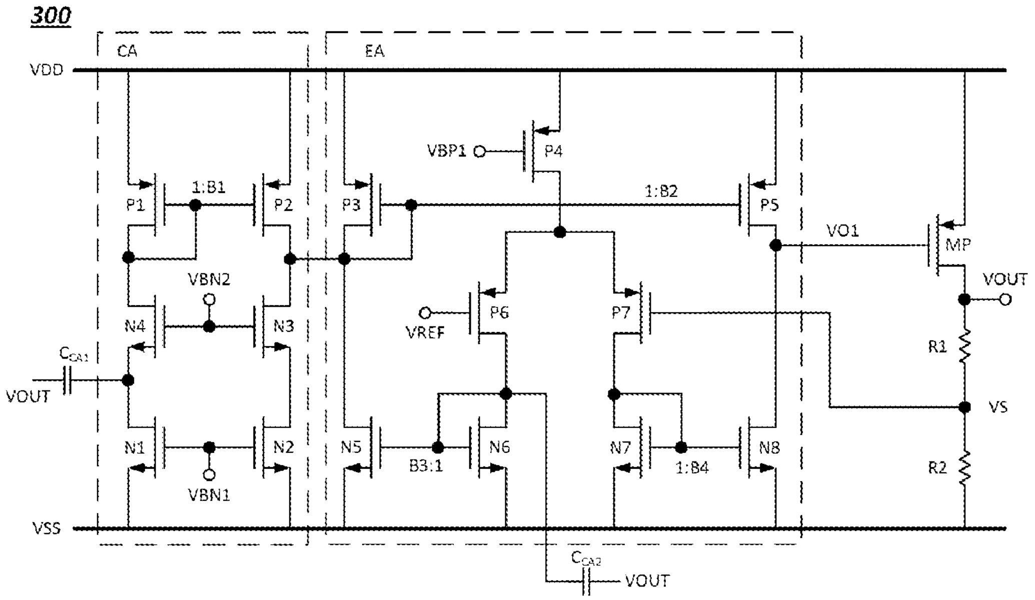
FIG. 3A, FIG. 3B and FIG. 3C respectively show schematic diagrams of the composition of an LDO circuit according to some embodiments of the present disclosure.
Figure 3B:
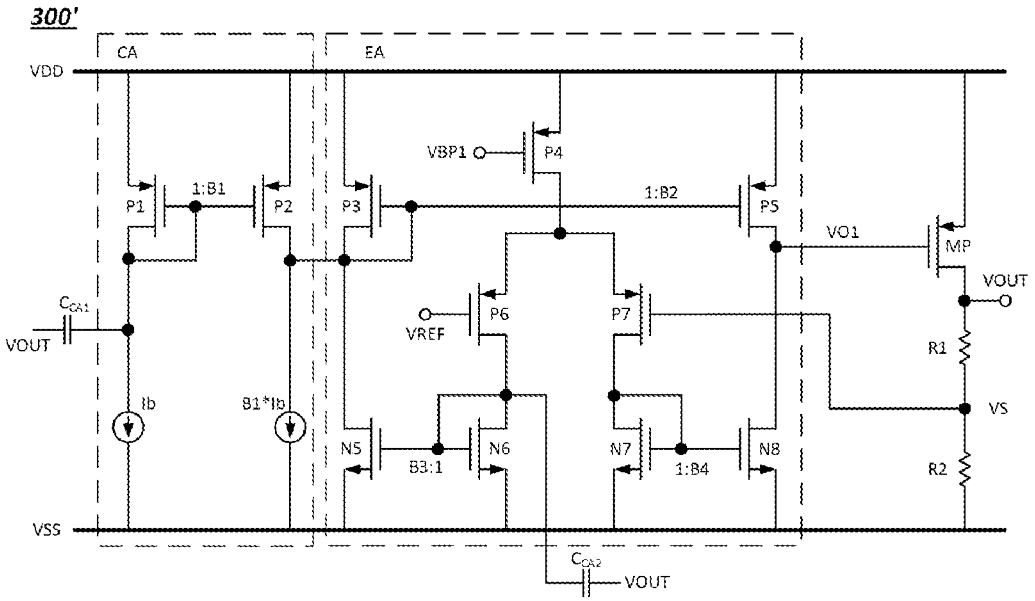
Figure 3C:
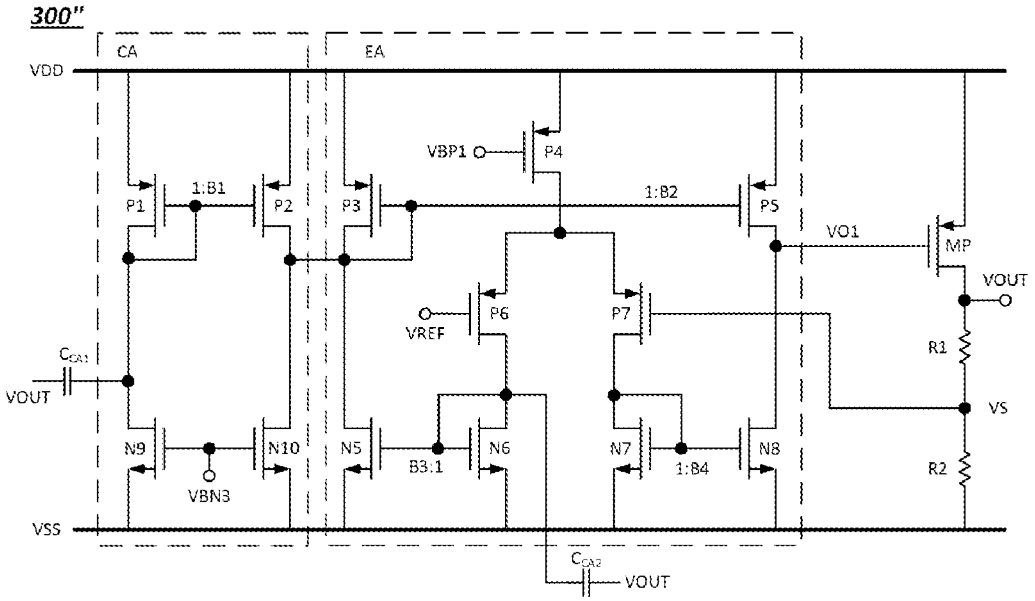

In some embodiments, the current amplifier CA may include a current mirror with an amplification factor greater than 1, which amplifies a current $I_B$ flowing through the first frequency compensation capacitor $C_{CA1}$. For example, the first frequency compensation capacitor $C_{CA1}$ may be coupled to a node in a current source to which the reference branch of the current mirror is coupled (such as shown in FIG. 3A), or may be coupled to a node at which the reference branch of the current mirror and its current source are coupled (such as shown in FIG. 3B and FIG. 3C). This will cause the current $I_B$ flowing through the first frequency compensation capacitor $C_{CA1}$ to be added to the reference branch, so as to be amplified and output by the output branch. Those skilled in the art should understand that, the current mirror and its reference current source may be implemented by using any suitable circuit structure.

In some embodiments, the error amplifier EA may be an operational transconductance amplifier (OTA), and the power transistor MP as an output stage may be a PMOS transistor.

In addition, since the output terminal of the error amplifier EA is connected to the gate of the power transistor MP, and the size of the power transistor MP is generally large, the value of the capacitive load seen by the output terminal of the error amplifier EA is large. Therefore, optionally, a Class AB error amplifier structure may be used, which is beneficial to the transient establishment of the gate of the power transistor MP.

In addition, in some embodiments, the error amplifier EA may be an amplifier having two or more stages. For example, the error amplifier EA may include a current mirror used as one-stage amplifier therein, that is, the error amplifier EA may be such as a current mirror type OTA.

In some embodiments, as shown in FIG. 2A, the output node of the LDO may be coupled to an off-chip load capacitor $C_L$. The off-chip load capacitor is located outside the chip where the LDO is located, the capacitance value of the off-chip load capacitor is of the magnitude level of μF, and the capacitance values of the first frequency compensation capacitor $C_{CA1}$ and the second frequency compensation capacitor $C_{CA2}$ are of the magnitude level of pF. That is to say, as mentioned above, the LDO does not include the off-chip load capacitor $C_L$, but may be coupled to the large off-chip load capacitor $C_L$ when actually connected to the load. In addition, the equivalent capacitance value of the output terminal of the error amplifier EA may also be of the pF magnitude level. Coupling a large off-chip load capacitor when actually using the LDO, is beneficial to improve the stability of the LDO.

In order to further enhance the capacitance multiplication effect of the compensation capacitor $C_{CA1}$, the present disclosure may further amplify the current $BI_B$ output by the current amplifier CA by using the error amplifier EA itself or an amplifier included therein. That is to say, the frequency compensation structure in the LDO shown in FIG. 2A may be modified to obtain, for example, the structure shown in FIG. 2B, where the output terminal of the current amplifier CA is coupled to an internal node of the error amplifier EA (hereinafter referred to as a first internal node) rather than its output terminal.

In some embodiments, in the case that the error amplifier EA is an amplifier having two or more stages, the output terminal of the current amplifier CA may be coupled to the amplifier of the second or subsequent stage in the error amplifier EA, so as to add this internal amplifier and its subsequent amplifiers (if any) into this negative feedback loop formed by the first frequency compensation branch to further enhance the effect of capacitance multiplication.

For example, the error amplifier EA may include a current mirror used as one stage of amplifier therein. The current amplifier CA may be coupled to the current mirror in the error amplifier, so that the current mirror further amplifies the current $BI_B$. That is to say, the current mirror within the error amplifier EA itself may be used as the second-stage current amplifier to further enhance the effect of capacitance multiplication and reduce the capacitance value required for frequency compensation, thereby reducing the chip area.

In addition, in some embodiments, the second frequency compensation capacitor $C_{CA2}$ coupled to the second internal node of the error amplifier EA, together with the error amplifier EA or its internal amplifier (such as the above-mentioned current mirror) and the power transistor MP, may also constitute another negative feedback loop in the LDO, which performs a frequency compensation function similar to that of the first frequency compensation capacitor $C_{CA1}$. The multiplication effect for the second frequency compensation capacitor $C_{CA2}$ is also related to the amplification factor of the error amplifier EA or its internal amplifier and the DC gain of the output stage of the LDO, which further enhances the capacitance multiplication effect.

The principle of the present disclosure will be described in more detail below in conjunction with a specific transistor structure of an LDO shown in FIG. 3A. Those skilled in the art should understand that, the specific transistor implementation of each part in FIG. 3A is only exemplary and non-restrictive, and those skilled in the art can make various deformations, modifications or optimizations as required under the guidance of the principle of the present disclosure. In addition, although FIG. 3A does not show the external load capacitor $C_L$ and the load current $I_L$ in FIG. 1 and FIGS. 2A-2B, it should be understood that, when the LDO 300 in FIG. 3A is actually used, its output terminal may also be coupled to the external load capacitor $C_L$ and the load current $I_L$.

As shown in FIG. 3A, the LDO 300 includes an error amplifier EA, a power transistor MP, sampling resistors R1 and R2, as well as a first frequency compensation capacitor $C_{CA1}$, a current amplifier CA and a second frequency compensation capacitor $C_{CA2}$ used for frequency compensation. The connection mode between the various parts in FIG. 3A is the same as that shown in FIG. 2B, and will not be repeated here.

The error amplifier EA includes a tail current source (PMOS transistor P4), a differential input transistor pair (PMOS transistors P6, P7), loads (NMOS current mirror N6/N5 and NMOS current mirror N7/N8) respectively coupled to the input transistors, and a PMOS current mirror P3/P5 used as the second stage of amplification (which is an example of the second current mirror as described in the SUMMARY above).

The gate of the input transistor P6 receives a reference voltage VREF, and the gate of the input transistor P7 receives a sampling voltage VS obtained by dividing the output voltage VOUT by way of the sampling resistors R1 and R2. The drains of the input transistors P6 and P7 are coupled to the NMOS current mirror N6/N5 and the NMOS current mirror N7/N8 respectively (which respectively serve as an example of the third and fourth current mirrors as described in the SUMMARY above), where N6 and N7 are diode-connected NMOS transistors, which serve as the reference branches (reference transistors) of their respective current mirrors, and N5 and N8 are output branches (output transistors) of their respective current mirrors, which are used to replicate or amplify (with amplification factors B3, B4 respectively, which both ≥1) the current in the reference branch. The reference branch in the PMOS current mirror P3/P5 used as the second stage of amplification (with an amplification factor B2 which ≥1) is a diode-connected PMOS transistor P3, whose drain is coupled to the drain of the output transistor N5 of the current mirror N6/N5. The output branch in the current mirror P3/P5 is a PMOS transistor P5, whose drain is coupled to the drain of the output transistor N8 of the current mirror N7/N8, is used as the output terminal of the error amplifier EA and is also coupled to the gate of the subsequent output stage power transistor MP.

The current amplifier CA comprises a PMOS current mirror P1/P2 (with an amplification factor B1 which ≥1)

(which is an example of the first current mirror as described in the SUMMARY above), and a current source coupled to the reference branch (a diode-connected reference transistor P1) of the PMOS current mirror P1/P2. The current source includes two cascoded NMOS transistors N1 and N4 for generating a reference current. The drain of the output transistor P2 of the current mirror P1/P2 is coupled to the drain of the reference transistor P3 of the current mirror P3/P5 in the error amplifier EA.

As shown in FIG. 3A, the output VOUT of the LDO 300 is coupled to one end of the compensation capacitor $C_{CA1}$, and the other end of the compensation capacitor $C_{CA1}$ is coupled to the source of the NMOS transistor N4 in the current amplifier CA. The drain of the NMOS transistor N4 is coupled to the drain of the reference transistor P1 in the current mirror P1/P2, thus the output undergoes the current magnification of B1 times brought by the current mirror P1/P2 and then reaches the drain of the output transistor P2, which is also the drain of the reference transistor P3 of the current mirror P3/P5 in the error amplifier EA. After further current magnification of B2 times brought by the current mirror P3/P5, the output reaches the gate of the power transistor MP, and then returns to the output terminal VOUT of the LDO 300 after being inverted and amplified by the transistor MP. The above constitutes a first negative feedback loop with current amplification, and the compensation capacitor $C_{CA1}$ realizes its capacitance multiplication after passing through this negative feedback loop. The current multiplication of the capacitor $C_{CA1}$ utilizes the current mirror P1/P2 in the current amplifier CA and the current mirror P3/P5 in the error amplifier EA. The total amplification factor of the compensation capacitor $C_{CA1}$ is the product of the DC gain $A_O$ of the output stage and the current amplification factor $B_{CA1}$ as follows:

$$A_O = G_{MP}R_{OUT}$$

$$B_{CA1} = B1B2$$

$$A_OB_{CA1} = G_{MP}R_{OUT}B1B2$$

In the above formulas, $G_{MP}$ is the output transconductance of the power transistor MP, and $R_{OUT}$ is the output impedance seen from the port VOUT.

In some embodiments, the values of B1 and B2 may make the current amplification factor $B_{CA1}$ be approximately tens, for example, 20-30.

In addition, as shown in FIG. 3A, the output VOUT of the LDO 300 is also coupled to one end of the compensation capacitor $C_{CA2}$, and the other end of the compensation capacitor $C_{CA2}$ is coupled into the input branch to which the input transistor P6 belongs, that is, is coupled to the node at which the input transistor P6 and its load are coupled. That is to say, the other end of the compensation capacitor $C_{CA2}$ is coupled to the drains of the transistors P6 and N6. The output undergoes the current magnification of B3 times brought by the current mirror N6/N5 and then reaches the drain of the output transistor N5, which is also the drain of the reference transistor P3 of the current mirror P3/P5. After further current magnification of B2 times brought by the current mirror P3/P5, the output reaches the gate of the power transistor MP, and then returns to the output terminal VOUT of the LDO 300 after being inverted and amplified by the transistor MP. The above constitutes a second negative feedback loop with current amplification, and the compensation capacitor $C_{CA2}$ also realizes its capacitance multiplication after passing through this negative feedback loop. The current magnification of the capacitor $C_{CA2}$ utilizes the current mirrors N6/N5 and P3/P5 in the error amplifier EA. The total amplification factor of the compensation capacitor $C_{CA2}$ is the product of the DC gain $A_O$ of the output stage and the current amplification factor $B_{CA2}$, as follows:

$$B_{CA2} = B2B3$$

$$A_OB_{CA2} = G_{MP}R_{OUT}B2B3$$

In some embodiments, the values of B2 and B3 may make the current amplification factor $B_{CA2}$ be about tens, for example, 20-30. Optionally, the compensation capacitors $C_{CA1}$ and $C_{CA2}$ may respectively have a capacitance value of about 40 pF. Since the required compensation capacitance value is greatly reduced due to the current magnification, on-chip capacitors may be used as the compensation capacitors $C_{CA1}$ and $C_{CA2}$.

The effect of the above frequency compensation will be analyzed in detail below.

Assuming that the equivalent transconductance of the error amplifier EA is $G_{EA}$, its output impedance is $R_{EA}$ and the equivalent capacitance at its output terminal is $C_P$ (mainly composed of parasitic capacitances $C_{GS}$, $C_{GB}$ and $C_{GD}$ of the power transistor MP), the output impedance seen from the LDO output terminal VOUT is $R_{OUT}$, and the external capacitive load is $C_L$ (the value range of $C_L$ is usually about 1~10 μF), the expressions of the dominant pole $P_D$ and the secondary dominant pole $P_{ND}$ of LDO 300 are as follows:

$$P_D = -\frac{1}{G_{MP}R_{OUT}R_{EA}(B_{CA1}C_{CA1} + B_{CA2}C_{CA2}) + C_LR_{OUT}}$$

$$P_{ND} = -\frac{G_{MP}R_{EA}(B_{CA1}C_{CA1} + B_{CA2}C_{CA2}) + C_L}{C_LC_PR_{EA}}$$

It is desired that the LDO of the present disclosure works in a wide load current range of about 10 μA~500 mA. However, the magnitude of the load current will affect the magnitude of the output transconductance $G_{MP}$ of the power transistor (bringing changes of several orders of magnitude), and then affect the positions of the poles as described in the above formulas. Therefore, the stability of the LDO according to the present disclosure operating in a wide range of load currents will be discussed below in three cases.

(1) When the load current $I_L$ connected to the output terminal VOUT is small (such as about 10 μA to hundreds of μA), $G_{MP}$ is small, and as mentioned above, the capacitance value of $C_L$ is of the magnitude level of μF and the capacitance values of $C_{CA1}$ and $C_{CA2}$ are only tens of pF magnitude, so that:

$$G_{MP}R_{EA}(B_{CA1}C_{CA1} + B_{CA2}C_{CA2}) \ll C_L$$

That is to say, the $G_{MP}$ term in the denominator of the $P_D$ expression and the $G_{MP}$ term in the numerator of the $P_{ND}$ expression can be ignored, so the expressions of $P_D$ and $P_{ND}$ can be simplified as:

$$P_D = -\frac{1}{C_LR_{OUT}}$$

-continued $$P_{ND} = -\frac{1}{C_P R_{EA}}$$

In the case of small load current, the value of $R_{OUT}$ and $R_{EA}$ are in the same order of magnitude, while the equivalent capacitance $C_P$ at the output of the error amplifier EA is about tens of pF, and the value range of the external load capacitance $C_L$ is 1~10 μF. Therefore, the dominant pole $P_D$ is located at the output node of the LDO and is effectively separated from the secondary dominant pole $P_{ND}$, which ensures stability under small load current conditions.

(2) When the load current $I_L$ connected to the output terminal VOUT is large (such as about 10 mA to hundreds of mA), $G_{MP}$ is large, so that:

$$G_{MP}R_{EA}(B_{CA1}C_{CA1} + B_{CA2}C_{CA2}) \gg C_L$$

That is to say, the $C_L$ term in the denominator of the $P_D$ expression and the $C_L$ term in the numerator of the $P_{ND}$ expression can be ignored, so the expressions of $P_D$ and $P_{ND}$ can be simplified as:

$$P_D = -\frac{1}{G_{MP}R_{OUT}R_{EA}(B_{CA1}C_{CA1} + B_{CA2}C_{CA2})}$$

$$P_{ND} = -\frac{G_{MP}(B_{CA1}C_{CA1} + B_{CA2}C_{CA2})}{C_L C_P}$$

In the case of large load currents, the compensation capacitors $C_{CA1}$ and $C_{CA2}$ are fully amplified through their respective current amplification circuits (the amplification factors are respectively $B_{CA1}$ and $B_{CA2}$) and the output stage DC gain ($G_{MP}R_{OUT}$, i.e., Miller effect), so the dominant pole $P_D$ is moved to the low frequency, and the secondary dominant pole $P_{ND}$ is pushed to the high frequency, that is to say, the two poles are effectively separated to ensure the stability under the condition of large load currents.

(3) When the load current connected to the output terminal VOUT is a medium load current ($I_L$ is about 1~5 mA), the $G_{MP}$ and $C_L$ items in the $P_D$ expression and the $P_{ND}$ expression may not have the relationship of "«" or "»" as above, so the dominant pole $P_D$ and the secondary dominant pole $P_{ND}$ may not be too far apart, resulting in the worst case for the stability of the LDO.

Therefore, the present disclosure introduces the compensation capacitor $C_{CA2}$ as described above. The capacitor $C_{CA2}$ and the transconductance $G_{M6}$ of the transistor N6 form a left-half-plane zero, and the expression of the zero is:

$$Z_{LHP} = -\frac{G_{M6}}{C_{CA2}}$$

The zero generated by the compensation capacitor $C_{CA2}$ compensates the phase effect brought by the secondary dominant pole to a certain extent, so as to guarantee the stability under the medium load current.

In addition, the magnitude of the transconductance $G_{M6}$ of the transistor N6 is related to the current flowing therethrough. Since the current of the input stage of the error amplifier EA (such as the current flowing through the transistors P6 and N6) is basically fixed (does not vary with the output load current $I_L$), the transconductance $G_{M6}$ of the transistor N6 basically has a fixed value. Therefore, the zero of the above formula is also basically fixed, and its value is related to the input stage current of the error amplifier EA and the magnitude of the compensation capacitor $C_{CA2}$.

To sum up, by using the compensation capacitors $C_{CA1}$ and $C_{CA2}$ to perform frequency compensation as described above, the LDO of the present disclosure can work stably in a wide load current range of about 10 μA to 500 mA. Moreover, due to the capacitance multiplication effect obtained by multi-stage current amplification, the compensation capacitors $C_{CA1}$ and $C_{CA2}$ can be realized by using on-chip capacitors with smaller capacitance values, which reduces the chip area.

FIG. 3B shows a modification of the LDO 300 of FIG. 3A as an example.

The difference between the LDO 300' in FIG. 3B and the LDO 300 in FIG. 3A lies in the coupling position of the first frequency compensation capacitor $C_{CA1}$. That is to say, the first frequency compensation capacitor $C_{CA1}$ in FIG. 3A is coupled to the node within the current source (the cascoded transistors N1 and N4) to which the reference branch (the transistor P1) of the current mirror (the current mirror P1/P2) in the current amplifier CA is coupled, while the first frequency compensation capacitor $C_{CA1}$ in FIG. 3B is coupled to a node at which the reference branch (the transistor P1) of the current mirror (the current mirror P1/P2) in the current amplifier CA and its current source (denoted by the current source Ib symbol) are coupled.

In FIG. 3B, current source symbols are used to represent all circuit implementations capable of providing a reference current for the current amplifier CA, which include, for example, the current source circuits shown in FIG. 3A and FIG. 3C described later.

The frequency compensation effect similar to that of the LDO 300 in FIG. 3A can also be achieved through the coupling manner of the first frequency compensation capacitor $C_{CA1}$ in FIG. 3B, which will not be repeated here.

FIG. 3C shows a specific implementation of the current source in FIG. 3B as an example.

As shown in FIG. 3C, an NMOS transistor N9 may be used as a current source to which the reference transistor P1 of the current mirror P1/P2 in the current amplifier CA is coupled. The drain of the NMOS transistor N9 is coupled to the drain of the reference transistor P1 and the first frequency compensation capacitor $C_{CA1}$, its source is grounded, and its gate is coupled to a bias voltage VBN3. The current amplifier CA further includes an NMOS transistor N10 for maintaining the current B1*Ib in the other branch, whose drain is coupled to the drain of the output transistor P2, whose source is grounded, and whose gate is coupled to the bias voltage VBN3.

Those skilled in the art should understand that, for the convenience of discussing the principles of the present disclosure, each part of the LDOs shown in FIGS. 3A-3C adopts a basic transistor implementation, but it may also have various modifications or optimizations. For example, the transistors in the error amplifier EA and the current amplifier CA may be replaced with complementary type transistors, and the positions of VDD and VSS may be exchanged, so that the resulting circuits are essentially same as that shown in FIGS. 3A-3C. For example, the transistor P4 as the tail current source in the error amplifier EA may be replaced by other various suitable current sources. For example, each current mirror may be replaced with a current mirror of various other suitable structures, such as a cascode current mirror and the like. For example, the current source in the current amplifier CA may be replaced with other suitable circuits.

Figure 5:
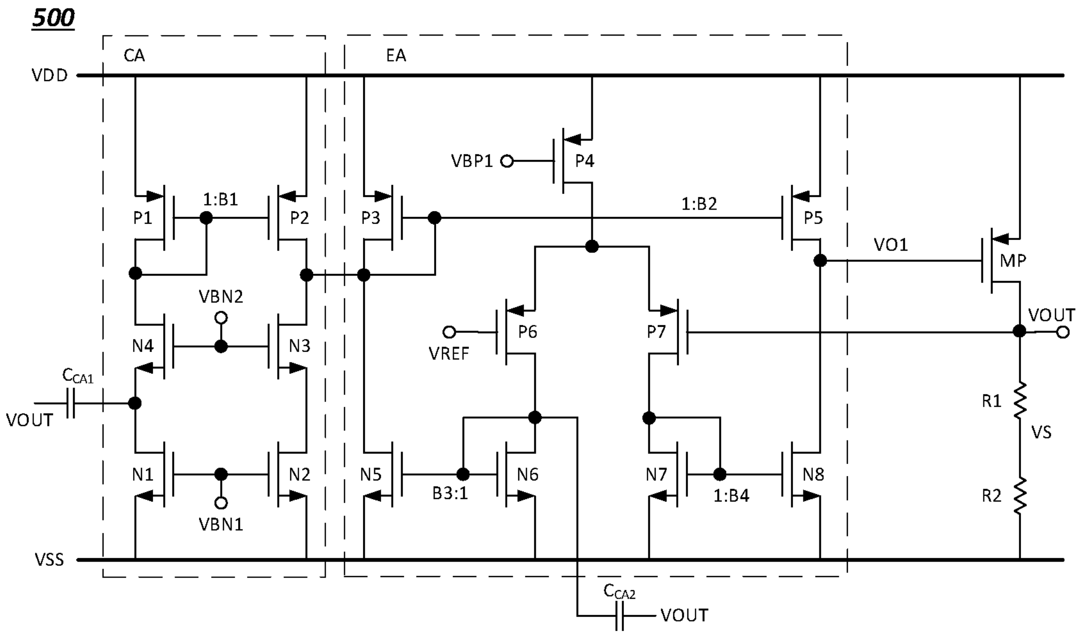
FIG. 5 shows a schematic diagram of the composition of an LDO circuit according to some embodiments of the present disclosure.

In addition, although the above drawings of the present disclosure show that the output voltage VOUT is sampled by the two resistors R1 and R2 and then the sampled voltage is input to the input terminal of the error amplifier EA, those skilled in the art should understand that, the circuit that samples the output voltage is not limited thereto, and may directly couple the output voltage VOUT to the input terminal of the error amplifier EA in some cases, for example as shown in FIG. 5. In addition, in some unshown embodiments, the reference voltage VREF may also be input to the non-inverting input terminal of the error amplifier EA, and the output voltage VOUT or its sampled voltage may be input to the inverting input terminal of the error amplifier EA as required.

FIG. 5 shows a modification of the LDO 300 of FIG. 3A as an example.

The difference between the LDO 500 in FIG. 5 and the LDO 300 in FIG. 3A only lies in that, in FIG. 5 the gate of the input transistor P7 receives the output voltage VOUT, rather than the sampling voltage VS obtained by dividing the output voltage VOUT by way of the sampling resistors R1 and R2. As shown in FIG. 5, the gate of the input transistor P7 is directly connected to the output node of the LDO, and thus receives the output voltage VOUT.

Figure 4:
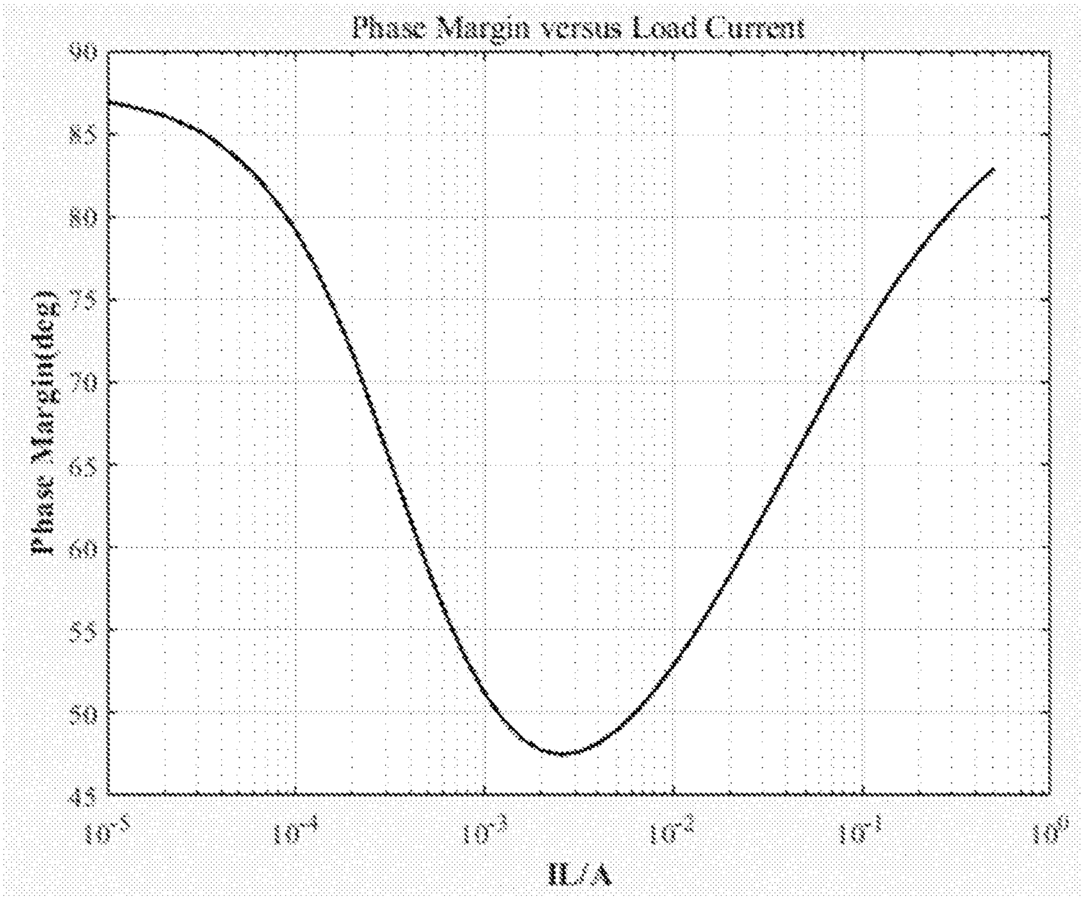
FIG. 4 shows a curve representing a relevance between phase margin and load current in an LDO circuit according to an embodiment of the present disclosure.

FIG. 4 shows how the phase margin of the LDO circuit such as shown in FIG. 3A varies with the load current $I_L$.

It can be seen from FIG. 4 that, in the case that the load current $I_L$ changes in the range of 10 μA~500 mA, the LDO always can remain stable. The minimum value of the phase margin is about 47°, and its corresponding load current $I_L$ is about 2.5 mA.

Therefore, the present disclosure achieves frequency compensation by adopting the frequency compensation structure which uses current amplification to realize capacitance multiplication, instead of the voltage buffer, so that the LDO can work under low power supply voltage, and can achieve frequency compensation for the LDO with a small frequency compensation capacitor (for example, it can be an on-chip capacitor), which will increase the stability of the LDO, and reduce the area of the chip. Moreover, in some embodiments, since the magnification of the frequency compensation capacitor in the present disclosure is at least the product of the current magnification and the DC (Direct Current) gain of the LDO output stage, the required frequency compensation capacitance value is much smaller than that used in the traditional method. In addition, in some embodiments, the present disclosure also introduces a left-half-plane zero by adding a frequency compensation capacitor coupled to the output voltage at an internal node of the error amplifier used by the LDO, thereby compensating the phase in the case of medium load current (about several mA) and thus ensuring the stability in the case of medium load current, so that the LDO of the present disclosure has good stability in the wide load current range of about 10 μA~500 mA.

Various embodiments of the present disclosure have been described above, and the foregoing descriptions are exemplary, not exhaustive, and not limiting of the disclosed embodiments. Numerous modifications and variations will be apparent to those of ordinary skill in the art without departing from the scope and spirit of the described embodiments. The terminology used herein was chosen to best explain the principles of the various embodiments, the practical application or improvement over the technology in the marketplace, or to enable others of ordinary skill in the art to understand the various embodiments disclosed herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A low dropout regulator comprising:

an error amplifier, comprising a pair of differential input transistors and loads respectively directly connected to the pair of differential input transistors, wherein, a gate of a first input transistor in the pair receives a reference voltage and a gate of a second input transistor in the pair receives an output voltage of the low dropout regulator or a sampled voltage obtained by sampling the output voltage;

a power transistor, a gate of which is coupled to an output terminal of the error amplifier, and a drain of which serves as an output node to output the output voltage;

a first frequency compensation branch, comprising a first frequency compensation capacitor and a current amplifier for amplifying the current flowing through the first frequency compensation capacitor, wherein, the first frequency compensation capacitor is coupled between the output node and the current amplifier, and the current amplifier is coupled to the output terminal of the error amplifier or a first internal node of the error amplifier so as to form a first negative feedback loop in the low dropout regulator; and a second frequency compensation capacitor, one terminal of which is directly connected to a second internal node of the error amplifier and the other terminal of which is directly connected to the output node, so as to form a left half-plane zero of the low dropout regulator, the second internal node is a node at which the first input transistor and the load of the first input transistor are directly connected.

2. The low dropout regulator according to claim 1, wherein, the current amplifier comprises a first current mirror with an amplification factor greater than 1.

3. The low dropout regulator according to claim 2, wherein, the first frequency compensation capacitor is coupled to a node within a current source to which a reference branch of the first current mirror is coupled, or is coupled to a node at which the reference branch of the first current mirror and the current source are coupled.

4. The low dropout regulator according to claim 3, wherein, the current source to which the reference branch of the first current mirror is coupled includes two cascoded transistors for generating a reference current, and the first frequency compensation capacitor is coupled to a node at which the cascoded transistors are connected.

5. The low dropout regulator according to claim 1, wherein, the zero formed by the second frequency compensation capacitor is fixed.

6. The low dropout regulator according to claim 1, wherein, the error amplifier includes a second current mirror used as one stage of amplifier in the error amplifier, and the current amplifier is coupled to the second current mirror, so that the second current mirror further amplifies the current flowing through the first frequency compensation capacitor.

7. The low dropout regulator according to claim 6, wherein, the current flowing through the second frequency compensation capacitor is amplified by at least the second current mirror, and the second frequency compensation capacitor together with at least the second current mirror forms a second negative feedback loop in the low dropout regulator.

8. The low dropout regulator according to claim 1, wherein, the load directly connected to the first input transistor comprises a third current mirror complementary to the type of the first input transistor, and the load directly connected to the second input transistor comprises a fourth current mirror complementary to the type of the second input transistor, and the error amplifier further includes a second current mirror, wherein, the reference branch of the second current mirror is coupled to the output branch of the third current mirror, the output branch of the second current mirror and the output branch of the fourth current mirror are coupled at a node which is the output terminal of the error amplifier.

9. The low dropout regulator according to claim 8, wherein, the current amplifier comprises a first current mirror with an amplification factor greater than 1, the first frequency compensation capacitor is coupled to a node within a current source to which the reference branch of the first current mirror is coupled, or is coupled to a node at which the reference branch of the first current mirror and the current source are coupled, a drain of the output transistor of the first current mirror is coupled to a drain of the reference transistor of the second current mirror, so that the first frequency compensation capacitor, together with at least the first current mirror, the second current mirror, and the power transistor, forms the first negative feedback loop.

10. The low dropout regulator according to claim 9, wherein, the first input transistor and the second input transistor are PMOS transistors, the third current mirror and the fourth current mirror are NMOS current mirrors, the second current mirror and the first current mirror are PMOS current mirrors, the current source to which the reference branch of the first current mirror is coupled includes two cascoded NMOS transistors for generating a reference current, and the first frequency compensation capacitor is coupled to a node at which the cascoded NMOS transistors are connected.

11. The low dropout regulator according to claim 8, wherein, the third current mirror and the second current mirror both have a current amplification factor greater than 1, and the current flowing through the second frequency compensation capacitor is amplified by at least the third current mirror, the second current mirror and the power transistor, so that the second frequency compensation capacitor, together with at least the third current mirror, the second current mirror and the power transistor, forms a second negative feedback loop in the low dropout regulator.

12. The low dropout regulator according to claim 1, wherein, the output node is capable of being coupled to an off-chip load capacitor, the off-chip load capacitor is located outside the chip where the low dropout regulator is located, and the capacitance value of the off-chip load capacitor is of a magnitude level of μF, and the capacitance values of the first and second frequency compensation capacitors are of a magnitude level of pF.

13. The low dropout regulator according to claim 12, wherein, the equivalent capacitance of the output terminal of the error amplifier is of a magnitude level of pF.

14. The low dropout regulator according to claim 1, wherein, the first negative feedback loop comprises at least the first frequency compensation capacitor, the current amplifier and the power transistor.

15. A chip, comprising a low dropout regulator according to claim 1.

16. The low dropout regulator according to claim 1, wherein, the load directly connected to the first input transistor comprises a third current mirror complementary to the type of the first input transistor, and the load directly connected to the second input transistor comprises a fourth current mirror complementary to the type of the second input transistor, and the error amplifier further includes a second current mirror, wherein, the second current mirror comprises a second reference transistor and a second output transistor, the second reference transistor is diode-connected, and a gate of the second reference transistor is directly connected to a gate of the second output transistor, the third current mirror comprises a third reference transistor and a third output transistor, the third reference transistor is diode-connected, and a gate of the third reference transistor is directly connected to a gate of the third output transistor, the fourth current mirror comprises a fourth reference transistor and a fourth output transistor, the fourth reference transistor is diode-connected, and a gate of the fourth reference transistor is directly connected to a gate of the fourth output transistor, a drain of the third reference transistor is directly connected to a drain of the first input transistor, and a drain of the fourth reference transistor is directly connected to a drain of the second input transistor, a drain of the second reference transistor is directly connected to a drain of the third output transistor, a drain of the second output transistor is directly connected to a drain of the fourth output transistor, and constitutes the output terminal of the error amplifier.

17. The low dropout regulator according to claim 16, wherein, the current amplifier comprises a current source and a first current mirror with an amplification factor greater than 1, wherein, the first current mirror comprises a first reference transistor and a first output transistor, the first reference transistor is diode-connected, and a gate of the first reference transistor is directly connected to a gate of the first output transistor, the current source is directly connected to a drain of the first reference transistor, a first terminal of the first frequency compensation capacitor is directly connected to the output node, and a second terminal of the first frequency compensation capacitor is directly connected to a node within the current source, or to the drain of the first reference transistor, a drain of the first output transistor is directly connected to the drain of the second reference transistor, so that the first frequency compensation capacitor, together with at least the first current mirror, the second current mirror, and the power transistor, forms the first negative feedback loop.

18. The low dropout regulator according to claim 16, wherein, a drain of the second output transistor is directly connected to the gate of the power transistor.

19. The chip according to claim 15, wherein, the low dropout regulator is configured as defined in claim 16.

20. The chip according to claim 15, wherein, the low dropout regulator is configured as defined in claim 17.

* * * * *